United States Patent Office 2,907,460
Patented Oct. 6, 1959

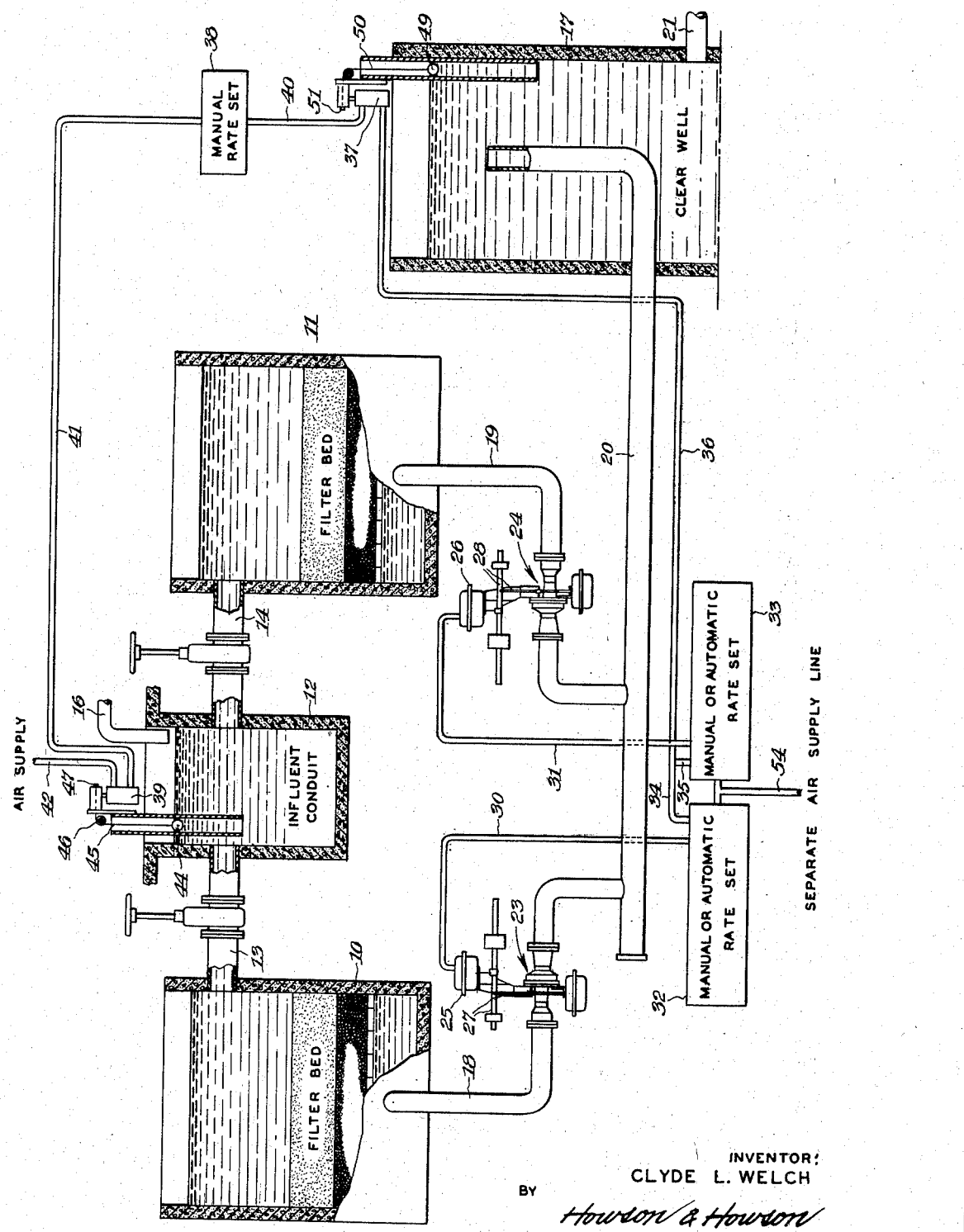

2,907,460
FILTER SYSTEM COORDINATED FLUID LEVEL CONTROL

Clyde L. Welch, St. Petersburg, Fla., assignor to Simplex Valve and Meter Company, Lancaster, Pa., a corporation of Delaware Application November 12, 1957, Serial No. 695,659

7 Claims. (Cl. 210—110)

This invention relates to regulation of water level in a single filter bed or in a plurality of filter beds fed by a common influent or settling basin and feeding a clear well, the level of water in which also may be regulated. In particular, this invention relates to such a filter system in which the water level or levels are controlled by regulating a valve in the effluent line leading from the filter to the clear well.

Filter beds, such as those commercially used to purify water, rely upon the removal of impurities from water passing through their successive layers of sand and gravel or other porous media. In order to perform efficiently, however, the filter beds must be certain to have a head or water level above the top of the sand bed. This water level, in turn, is determined by the rate of inflow into the filter bed from the influent or settling basin through which water passes prior to filtering and which usually also serves as a settling basin in which some of the heavier solids are removed from the water by a process of gravitational settlement.

In the prior art, the water level in the filters or systems of the above type have been adversely affected by conditions existing in the influent or settling basin and in the clear well. For example, on the influent side, if the water level drops below the top of the sand bed, air will be entrained therein and be detrimental to both the filtering and washing cycles of the filter. Such a problem might arise due to a gradual fall off of supply, a complete failure of supply or where freeboard is limited and a high flow induces excessive head loss in the connecting conduit or pipes between the basin and filters. On the other hand at certain times of day consumer consumption may be so relatively low that water in the clear well tends to overflow, with the consequent loss of processed water.

Neither one of these conditions is desirable and, as a consequence, considerable effort has been devoted to attempting to overcome them, either separately or together. The present invention is directed to a control system whch is designed to prevent these two problems, since specifically it prevents overflow of the clear well and prevents deficiency of head on the filter bed due to scarcity of water supply. The system is simple and easily applied to water filtration plants now in existence or may be a part of a new integrated plant control system.

Specifically, the present invention is directed to a filter bed water level and/or clear well control system which is part of a filter system employing a filter bed fed from an influent supply and feeding a clear well. The system requires valve means for the effluent line from the filter bed to the clear well and a fluid pressure sensitive transducer for converting fluid pressure to mechanical positioning or force application coupled to the valve means so that the mechanical positioning parts adjust the opening of the valve. A fluid pressure supply is connected to the transducer by a supply line in which there is one or more regulating means in series whose settings determine the applicable pressure thereafter in the line. Means responsive to the water level in the influent conduit or settling basin operates the first pressure regulating means closest to the fluid pressure supply, and tends to further close that means as the water level lowers. Means responsive to the water level in the clear well operates a second pressure regulating means closest to the transducers and tends to further open the second means the lower the clear well water level. As will appear, there can be a third pressure regulating means in the line and a multiplicity of filter beds fed from the same source of supply and feeding the same clear well.

For a better understanding of the present invention, reference is made to the drawing in which is schematically illustrated a filter system employing the water level control system of the present invention.

Referring to the drawing, a system is shown in which a pair of filter beds 10 and 11 are supplied water from an influent conduit 12 from a settling basin (not shown) through feed lines 13 and 14 which, in practice, may be separate as shown, or connected by a manifold to the basin. Each feed line may have a manually operated valve for use during clean out or shut down, as shown. The basin itself is fed from a reservoir or other water supply. The filter beds, in turn, feed a clear well 17 through effluent lines 18 and 19 which, in practice, may be coupled to a manifold line 20 or individually fed into the clear well 17. The clear well 17, in turn, has at least one effluent line 21 delivering by gravity to a reservoir or has its contents withdrawn through suction pipes to pumps for high service discharge. No shut off valves have been shown in lines 18, 19 and 20 for the sake of simplicity and there may be none in the latter. Likewise a valve or valves will normally precede the settling basin to control water level therein. It will be appreciated that additional valves may be supplied to any of the lines in the system for the purposes which are not of importance here. Valves which are of importance here, however, are valves 23 and 24 provided in effluent lines 18 and 19 connecting the filter beds 10 and 11, respectively, to the clear well 17. These are rate controlling valves whose function is to establish the same rate of flow in lines 18 and 19, said valves most probably having different positions at any given time since the condition of the two filters, as to loss of head through them, is extremely unlikely to be the same. The structure of valves of this type is known in the art and consequently will not be described in detail here.

Operating valves 23 and 24 to establish and adjust permissible rates of flow are transducers 25 and 26 which are mechanically coupled to the valves 23 and 24 by mechanical coupling means 27 and 28, consisting of a beam and cable arrangement also affected by a standard rate of flow differential pressure system for maintaining the flow rate constant. These transducers, through these mechanical coupling means, adjust the positions of valves 23 and 24 in response to a controlled air pressure. Other types of controlled fluid pressure might of course, be substituted for air pressure in appropriate cases. Transducers 25 and 26 are connected through lines 30 and 31 back through selector valves 32 and 33 and lines 34 and 35, respectively, to a manifold 36 which supplies air to all transducers coupled to it at a common adjusted pressure regulating means 37 positioned with reference to clear well level, which means is in series with manually set pressure regulator 38 and another adjustable pressure regulating means 39 positioned with respect to the influent water level, all connected by line sections 40, 41 and 42. Each of the pressure regulating means might be of a type manufactured by Governair Division of Bellofram Corporation of Burlington, Mass., known as their Series 5,000 model. Line 42 is connected to an air supply source (not shown) which is maintained at an adequate pressure. The pressure regulating means 37, 38 and 39 have the ability to reduce the pressure between each of them and the transducers 25 and 26. As a result of the arrangement described it will be observed that the successive pressure regulators are limited by the pressure set by the regulators ahead of them. Thus a practical consequence of the arrangement, whatever the pressure in line 41, for example, the pressure in line 40 can never exceed it.

Pressure regulating means 39 is preferably adjusted by means responsive to the level of water in the influent or settling basin 12, so that as the level in the settling basin and all influent bodies and conduits goes down, the pressure regulating means 39 readjusts to reduce the pressure in the section of line 41 and possibly in all subsequent sections. The means operating the pressure regulating means is here located in the influent conduit and shown in this case as a float 44 connected by a flexible line 45 to a counter-weight (not shown) or other suitable means for taking up slack in the line. Line 45 passes over direction-changing pulley 46 and may pass around a sheave 47 which operates the pressure regulating means 39 and thence over another direction-changing pulley (not shown) to the counter-weight. The arrangement of parts is such that an increase in water level will increase the pressure in line 41. The water level in the settling basin is the water level in the influent conduit and in the filters so that the float may be located anywhere in this part of the system. However, location in the quietest part of the system, which may be in an influent conduit, is preferred.

The manual rate set 38 simply involves a manual means of positioning or biasing to a desired pressure which, effectively, sets the maximum pressure in line 40.

Pressure regulating means 37 is operated by a float 49 coupled by a line 50 to a weight (not shown) or other suitable slack eliminating device and passing over suitable pulleys and around a sheave 51 on the pressure regulating means 37 whereby the position of the pressure regulating means is adjusted. In this case, however, the arrangement is such that the pressure adjusting means will tend to reduce the pressure, the higher the level of the float 49 in the clear well.

The relationship described of fluid pressure to level suits a preferred arrangement of applying loading by transducers 25 and 26 to valves 23 and 24. By this arrangement a failure of pressure closes valves 23 and 24 and therefore affords maximum protection of the filters. However the reverse effect of fluid pressure supplied to transducers 25 and 26 is likewise permitted if the relationship of mechanical parts and means dictates.

Operation of the device as described thus far occurs as follows: Normal operation assumes that the influent or settling basin has sufficient water to supply the demands of the filter beds and that the clear well is not so full as to be in danger of overflowing. Under these conditions should the clear well begin to become overfull with the apparent danger of overflowing, the float 49 would rise and act upon the pressure responsive means to reduce the pressure fed to the transducers 25 and 26 so that the valves 23 and 24 would tend to close to reduce the flow to the clear well. Valves 23 and 24 preferably are arranged so that they have a tendency to assume a completely closed position and are made to open simply by the air pressure acting upon the transducer. At some point near overflow the valves would completely close and they would open again as the water in the clear well was used.

Should the water level in the settling basin drop, this would mean that the potential water supply to the filter beds would be diminished. In response to the movement of float 44 the pressure regulating means 39 would tend to reduce the pressure in line 41 to partially close valves 23 and 24, to reduce the rate of outflow from the filter beds, thus maintaining the beds at their proper head despite slowed feed. Should the water level in influent tank 12 drop below the point at which feed could be sustained, the valves would be completely closed so that the head on the filter bed would never drop below the critical point needed for proper filtering.

It should be observed that, even if the clear well is nearly empty so that its pressure regulating means does not reduce air pressure at all, it is still undesirable to let the water level in the filter beds drop below the critical point. However, in accordance with the system of the present invention, pressure will be reduced by pressure regulating means 39 so that upon a lowering of the level of the water in the settling basin valves 23 and 24 would be closed.

From the above, it will be appreciated that the clear well is effective as the most sensitive control point in the system. If it determines throttling is required, throttling will occur even at the expense of backing up and increasing levels in filter beds and the influent system. Normally the influent system by virtue of its capacity can take such level increases as are brought about due to such throttling. However, if unable to absorb the increase in level control, the influent to the settling basin must control, and this is done in conventional fashion.

In practical situations, the water level in the settling basin might drop considerably without endangering the maintenance of an adequate head in the filter beds. Over this non-critical range of decrease in influent water level, it is unnecessary that any closure of the valves should take place. On the other hand basic filter design or other regulations may limit the maximum rate at which filtering should be allowed except in an emergency. It is for this purpose that the manual pressure adjustment means 38 is provided. Like regulating means 37 and 39, this means functions to exclude pressures over the selected amount from the lines beyond them. In other words, the regulating means act as means setting a ceiling or maximum to pressures that may exist beyond them. Use of manually set regulator 38 provides a condition in which the pressure on the transducers will not be affected when the maximum pressure permitted by pressure means 39 exceeds that permitted by manual regulating means 38. However, as the pressure regulating means 39 sets a maximum pressure below that set by regulating means 38, it will affect the transducers and cause the valves to close upon further reduction of the water level of the influent.

The manual or automatic selector valves 32, 33 have the function of switching an individual transducer from the group automatic control line previously described to a separate air pressure supply line 54 in order to control the positioning of one of the valves 23 and 24 in accordance with some criteria other than clear well and influent well level. For example, experimental use of a given filter independent of the rest of the plant is thus provided for where a number of units are involved. The remaining units thereupon coact at a slightly different rate to maintain the overall or total discharge to clear well as required.

It will be clear to those skilled in the art that a single valve, similar to valves 23 and 24 with their associated controls, may be used in line 20 in place of the multiple valve arrangement in the filter bed effluent lines. This could be done for economy in certain cases, particularly where filter beds tend to maintain the same level.

While in this case a pair of filter beds has been shown, it will be obvious to those skilled in the art that the invention is equally applicable to a single filter bed or to any number of filter beds. Other modifications within the scope of the claims will occur to those skilled in the art.

I claim:

1. In a filter system employing a filter bed fed from a settling basin and feeding a clear well, a filter rate of flow control system comprising valve means for the effluent line from the filter bed to the clear well, a fluid pressure sensitive transducer for converting fluid pressure to mechanical positioning coupled to the valve means to adjust the opening of the valve, a fluid pressure supply for supplying fluid under pressure to the transducer, a supply line between the supply and the transducer, a pair of pressure regulating means whose settings determine the maximum pressure thereafter in the line in series in the supply line, means responsive to the water level in the settling basin operating the first pressure regulating means closest to the supply and tending to gradually lower the pressure beyond that first regulating means the lower the water level in the settling basin, and means responsive to the water level in the clear well operating the second pressure regulating means closest to the transducers and tending to gradually lower the pressure beyond that second regulating means the higher the water level in the clear well.

2. The system of claim 1 in which a third pressure regulating means is employed between the first and second regulating means in order to establish a maximum pressure which can reach the second pressure regulating means.

3. The system of claim 2 in which the third pressure regulating means is manually adjustable and does not readjust in accordance with any variable.

4. The system of claim 1 in which a plurality of filter beds are fed by the same settling basin and, in turn, feed a single clear well and separate valves are provided in each effluent line, each regulated by a separate transducer supplied fluid from the common supply line through the two pressure regulating means in series.

5. The system of claim 1 in which a plurality of filter beds are fed by the same settling basin and, in turn, feed a single clear well, and their separate effluent lines join a trunk line in which a single valve is regulated by a single transducer.

6. The system of claim 1 in which the level sensing devices in the settling basin and clear well are floats coupled to the regulating means to adjust its position.

7. The system of claim 4 in which each transducer may alternatively be decoupled from the common pressure supply line and coupled to a manually regulatable means connected to a fluid pressure supply.

References Cited in the file of this patent

UNITED STATES PATENTS

| | | |
|---|---|---|
| 1,195,391 | Newman | Aug. 22, 1916 |
| 2,464,617 | Sebald | Mar. 15, 1949 |